W. J. KNOX.
APPARATUS FOR THE PRODUCTION OF GASEOUS OZONIDS.
APPLICATION FILED MAR. 11, 1912. RENEWED JAN. 17, 1914.

1,088,346.

Patented Feb. 24, 1914.

4 SHEETS—SHEET 1.

Witnesses:

William John Knox  Inventor

By his Attorneys

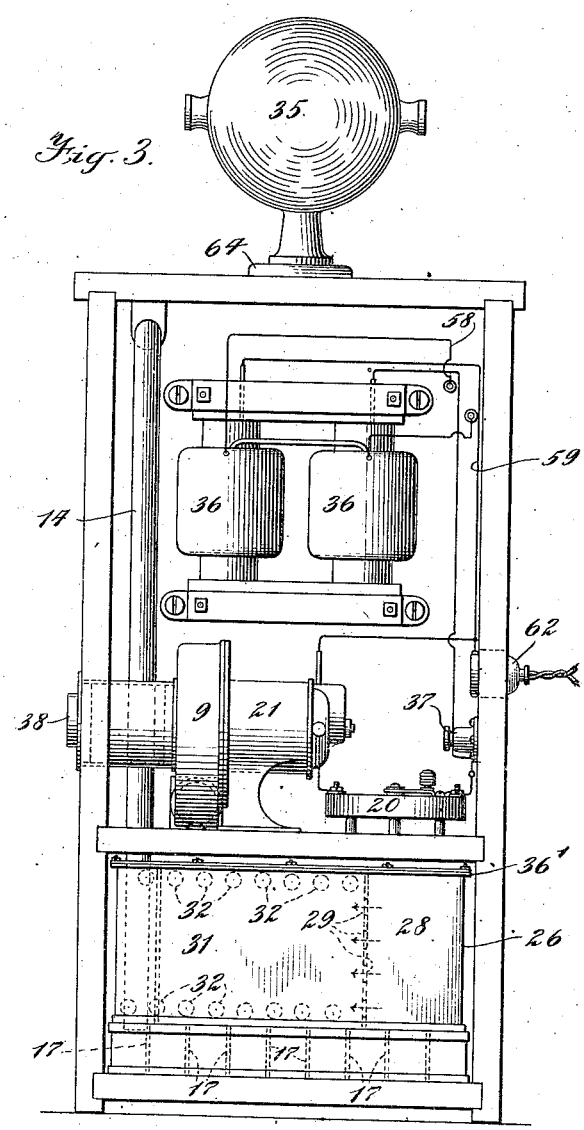

W. J. KNOX.
APPARATUS FOR THE PRODUCTION OF GASEOUS OZONIDS.
APPLICATION FILED MAR. 11, 1912. RENEWED JAN. 17, 1914.
1,088,346.
Patented Feb. 24, 1914.
4 SHEETS—SHEET 3.
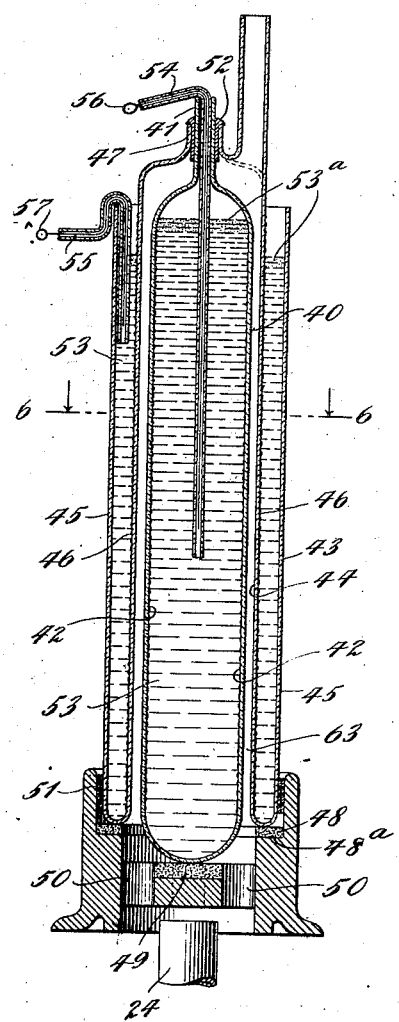
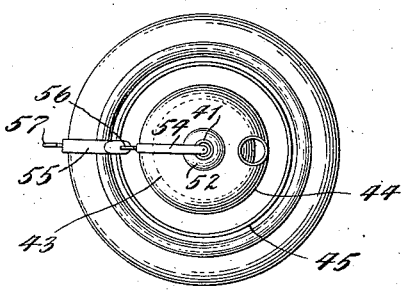
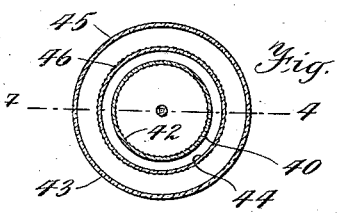
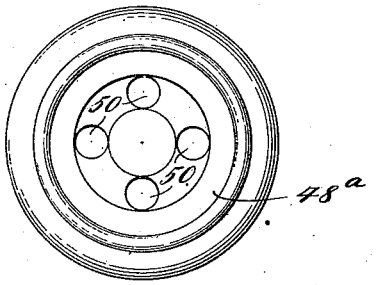

W. J. KNOX.
APPARATUS FOR THE PRODUCTION OF GASEOUS OZONIDS.
APPLICATION FILED MAR. 11, 1912. RENEWED JAN. 17, 1914.
1,088,346.
Patented Feb. 24, 1914.
4 SHEETS—SHEET 4.
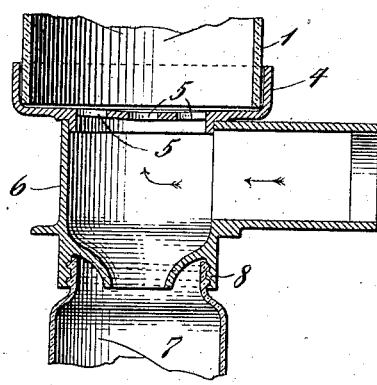
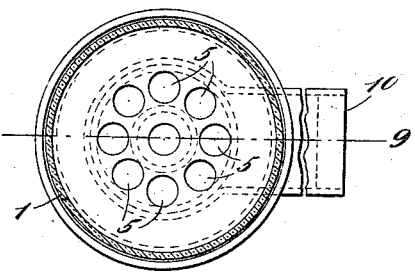
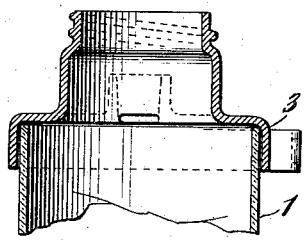
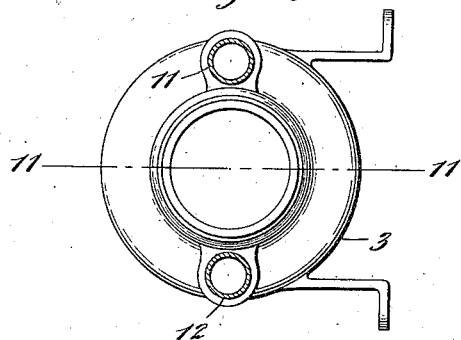
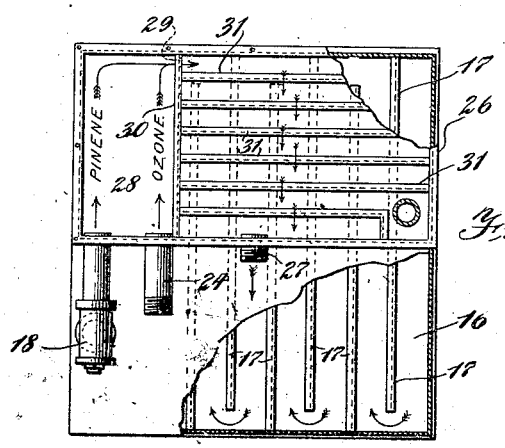
Witnesses:
Inventor
William John Knox
By his Attorney
Gifford Bull

UNITED STATES PATENT OFFICE.

WILLIAM JOHN KNOX, OF NEW YORK, N. Y., ASSIGNOR TO KNOX TERPEZONE COMPANY OF AMERICA, A CORPORATION OF WEST VIRGINIA.

APPARATUS FOR THE PRODUCTION OF GASEOUS OZONIDS.

1,088,346.  Specification of Letters Patent.  Patented Feb. 24, 1914.

Original application filed December 2, 1911, Serial No. 663,602. Divided and this application filed March 11, 1912, Serial No. 683,118. Renewed January 17, 1914. Serial No. 812,859.

*To all whom it may concern:*

Be it known that I, WILLIAM JOHN KNOX, a citizen of the United States, and a resident of New York city, borough of Manhattan, in the county of New York and State of York, have invented certain new and useful Improvements in Apparatus for the Production of Gaseous Ozonids; and I do declare the following to be a full, clear, and exact description of the invention, such as will enable others skilled in the art to which it appertains to make and use the same.

This application is filed as a division of my application Serial No. 663,602, filed December 2, 1911.

My invention relates broadly and generally to new and useful improvements in apparatus for forming gaseous compounds, and more particularly for the production of gaseous ozonids.

The invention consists in the combination and arrangement of parts and their construction to be fully described hereinafter, and the novelty of which will be particularly pointed out and distinctly claimed.

Figure 1:
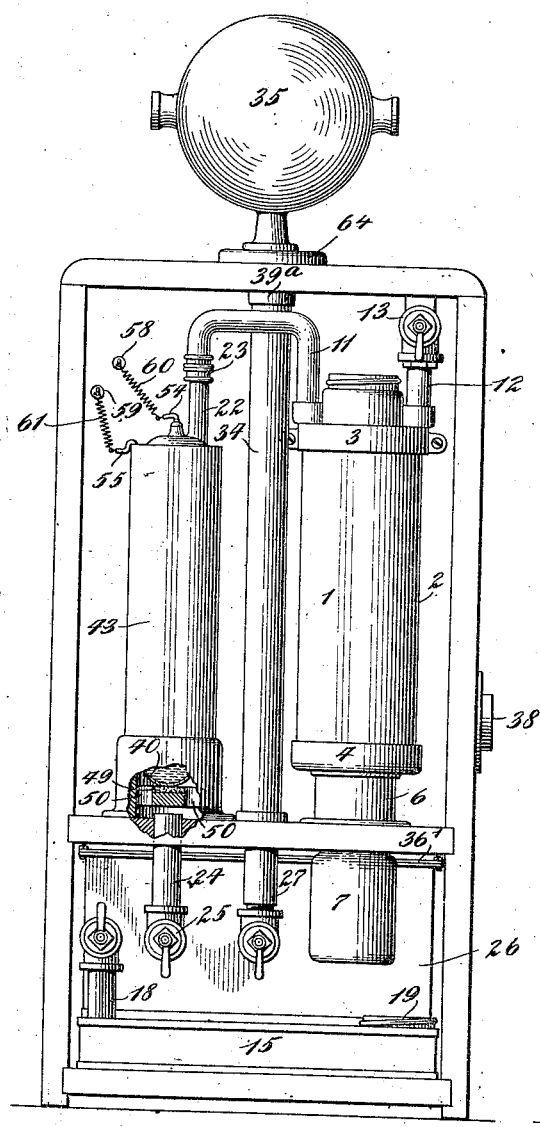
Figure 2:
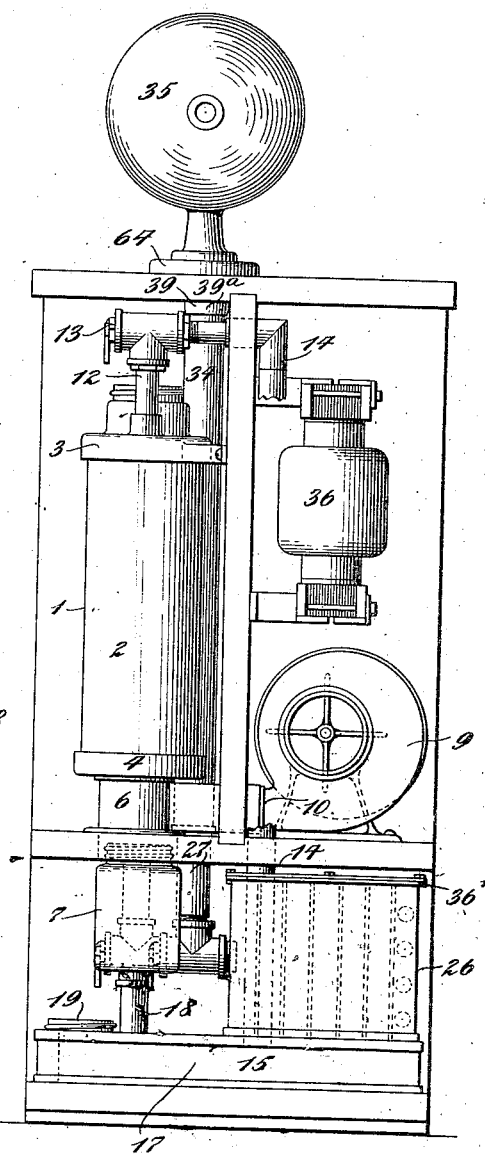

I have fully and clearly illustrated my invention in the accompanying drawings to be taken as a part of this specification, and wherein, Figure 1 is a front view in elevation; Fig. 2 is a side view in elevation; Fig. 3 is a back view in elevation; Fig. 4 is a vertical sectional view of the ozone generating tube; Fig. 5 is a plan of the tube; Fig. 6 is a section taken at 6—6 in Fig. 4; Fig. 7 is a plan view of the base for the tube; Fig. 8 is a plan of the base of the air drying tube (Fig. 1); Fig. 9 is a vertical section taken at 9—9 in Fig. 8; Fig. 10 is a plan of the top of the air drying tube (Fig. 1); Fig. 11 is a section taken at 11—11 in Fig. 10; Fig. 12 is a plan view partly broken away of the evaporating tank.

Similar reference figures refer to similar parts in the different drawings.

In Fig. 1, is shown an air drying tube or apparatus, 1, through which all the air used in the apparatus is caused to pass. The parts of this tube are shown in detail in Figs. 8, 9, 10 and 11.

Referring to Fig. 1, 2 is a glass cylinder firmly and hermetically cemented into the top and bottom castings 3 and 4 respectively. The bottom casting 4, as shown in Fig. 9, in section and in Fig. 8 in plan is pan shaped to support lumps of a dehydrating material such as fused calcium chlorid, but at the same time is perforated as at 5, to allow of the passage of an air current, and to permit of the escape of water into the jar or catch-receptacle 7.

The bottom casting 6, forms the base or support of the drying tube, but as shown in section in Fig. 9, is not rigidly attached thereto. The glass jar, $7_1$ is the ordinary Mason jar and is used on account of the ease with which it may be replaced should it become broken; it is attached to the base casting 6, by the threaded neck 8. As will be seen by reference to Fig. 1, this arrangement permits of the easy removal of the jar when it is necessary to empty it.

In Fig. 2, is shown a fan blower 9. The discharge opening or neck of this fan enters the neck of the base casting 6, at point 10 in Fig. 2. At the top of the drying tube, pipe connections 11 and 12, are provided for the discharge of the dry air from the drying cylinder 1, and in the discharge pipe 12, is shown a regulating valve 13. From this valve 13, the pipe 14 makes connection with the pinene evaporating tank 15. This evaporating tank 15, is shown in elevation in Fig. 3, and in plan at 16 in Fig. 12. In the tank 15 are vertical ribs or partitions 17, 17 extending from the bottom to the top of the said tank, but cut away at alternate ends, as shown by the arrows in Fig. 12; by which arrangement dry air entering the first passage from the air pipe 14, passes through the vertical channels formed by the ribs 17, 17 continuously until it emerges through the pinene vapor discharge 18. By this provision the air is caused to take a circuitous path back and forth over the surface of the pinene in the tank 15 and insure a saturated vapor of pinene being formed. The pinene evaporating tank 15, is partly filled with liquid pinene through the screw cap opening 19, whereby the full area or bottom of the tank is completely covered and a uniform area of evaporating surface is secured at all times. As this area of evaporating surface is large and constant, and preferably greater than necessary, a maximum amount of pinene vapor is generated, and the rate of evaporation of pinene can be regulated by controlling the air supply by the valve 13. By means of the rheostat 20, as shown in Fig. 3, the speed of the fan motor 21, may be varied, whereby the total amount of the air blown through the apparatus may also be regulated.

Referring again to dry air discharge pipe 11, in Fig. 1, connection is made by means of fiber bushing 23, to an ozone generating tube 22; through this tube the dry air from pipe 11, passes downward through the air gap or space, between the dielectric walls shown in Fig. 4 and emerges by means of the discharge pipe 24, through valve 25.

In Fig. 1, is shown in front elevation the gas mixing or reaction chamber 26. This is also shown in vertical section and in elevation in Figs. 2 and 3, and in plan in Fig. 12. The object of this chamber is to cause a thorough intermingling of the dry vapor of pinene entering through pipe 18, and of ozone entering through pipe 24, whereby the pinene vapor and the ozone gas are caused to unite chemically and form the optically visible pinene ozonid product. The pinene vapor and ozone enter the chamber 28, as shown in Figs. 3 and 12, they then pass through openings 29, in the vertical wall 30; the remainder of the chamber is provided with vertical partitions 31. These partitions have openings 32, along their upper and lower edges alternating so that the pinene and the ozone are caused to pass upward and downward through the vertical spaces in direction of the arrows shown in Fig. 12, to the outlet pipe 27, and thus be thoroughly commingled to form the gaseous ozonid. From this discharge pipe 27, the pinene ozonid gas passes upward through the glass pipe 34, to the top of the machine and thence into the glass globe 35, from which it emerges into the atmosphere of the room or building. In Fig. 2, is shown an electrical transformer, 36, whereby the ordinary low voltage alternating service current may be raised to a sufficiently high voltage, approximately 10,000, sufficient to electrify the ozone tube 22.

The vapor mixing tank 26, has a flat removable cover 36', by the removal of which the interior may be readily inspected or cleaned. In order to seal the joints made by the edges of the tank 26, and the top of the ribs 30 and 31, a sheet of packing felt is placed under the cover in contact with the vertical edges.

In Fig. 3, is shown a fuse plug 37, interposed between the machine circuit and the exterior service line. This fuse is preferably of lower resistance than the fuse plug in the service line, whereby any accidental increase in resistance in the apparatus will first blow it and thus save the external circuit. At 38, in Figs. 1 and 3, is shown an external pipe connection to the inlet of the fan; to this pipe connection a pipe may be attached and extended to an outside air supply, as through a window or other opening. This is very desirable, as it supplies fresh air to the apparatus at all times and assists in ventilating the room itself.

As pointed out above, the drying tube 1, is detachable at the joint between castings 4 and 6. At 39, in Fig. 2, is shown a bushing nut 39$^a$, and by loosening this nut and bushing 23, the drying tube may be readily lifted from position for repairing or cleaning.

In Figs. 4, 5, 6, and 7 is shown the ozone generating tube I employ.

It is well known that electrical discharges take place most readily from points and least readily from smooth surfaces. Electrodes with perfectly smooth, plane surfaces are undesirable for this reason, because the electric tension accumulates on such surfaces until the electric strain ruptures at some point which may be nearest to the opposing electrode and an arc of violent discharge occurs. In converting the oxygen of common air into ozone it is highly undesirable that any arcing occur, even incipient arcing, as such concentrated localized discharges cause the formation of nitrogen oxids. To attain this object I make use of a liquid electrode and a corresponding solid dielectric, whose opposing surfaces are at all points in substantially intimate contact, and in which, such surfaces in contact, consist of an exceedingly great number of fine, uniform indentations and corresponding points, all of which lie practically in a true plane. This I accomplish by making use of a glass dielectric plate or tube one of whose surfaces has been slightly, but sensibly etched or roughened by the action of hydrofluoric acid, the vapor or liquid, or by the action of a fine sand blast. Against this finely indented glass surface I place a layer of metallic mercury or other liquid conductive material, such as an acidulated solution, which will enter the indentations and conform to the surface of the roughened dielectric. The mobile conductive liquid or electrolyte in contact with the roughened surface of the dielectric thus forms an electric discharging surface with an innumerable number of fine points of discharge, and at the same time the electrode surface and the dielectric surface are in absolutely uniform intimate contact.

Referring to Fig. 4, 40 is a glass tube closed or sealed at the bottom and contracted at the top into a tubular neck 41. The interior surface of this tube, as shown at 42, is roughened, preferably by means of hydrofluoric acid; 43 is a hollow, double walled tube, the inner and outer walls 44 and 45 of which are joined or sealed at the bottom, thus forming an annular cylindrical vessel. The inner surfaces of the walls constituting this annular vessel are roughened preferably by means of hydrofluoric acid, as shown at 46. The inner wall 44 of this annular cylindrical vessel 43 is contracted at the top into a dome shape with a central tubulure 47 of greater diameter than the neck 41 of the inner tube.

Fig. 7 is a plan of the base shown in vertical section in Fig. 4, said base being cup-shaped and preferably made of porcelain. 48 is a cork or felt washer supported on an annular shoulder 48ᵃ in said base on which washer the outer tube rests, and 49 is a similar cork or felt pad or support for the inner tube. 50 are vertical holes or passages in the base. The tubes are assembled concentrically and placed within the base. The annular space between the outer tube and the top part of the base is closed or packed by means of cotton or asbestos cord 51. The tubes are concentrically positioned with regard to each other by means of the perforated stopper, 52, which also closes the opening in the tubulure 47, and closely fits the neck 41. The tubes are filled with a conducting liquid 53, the inner tube being filled to a point higher than the outer tube so that the electric discharge will not take place from the edge of one electrolyte to the edge of the other. The liquid in both tubes, if aqueous conducting liquid is used, is covered with a film or layer of oil 53ᵃ, preferably paraffin, so as to prevent evaporation and to act as a non-conducting cover.

54 and 55 in Figs. 4 and 5 are metallic wire connections to the conducting liquid. The wire is preferably gold or platinum and is incased in a glass tube but does not extend to the lower ends of the tubes. It is preferably stopped about one half of an inch from the end of the tube so that the glass wall of the tube will act as a non-conducting shield and prevent a direct discharge from the pointed end of the wire conductor to the dielectric wall. The conducting wire 54 in the inner tube is much larger than the wire in the outer tube whereby their ends or discharge points are widely separated, and the tendency of the current to pass directly from point to point is prevented. At the outer ends of the wires 54 and 55 loops 56 and 57 are provided.

Fig. 1 and Fig. 5 show leads 58 and 59 from the high tension or secondary coils 36, and between these high tension leads, and the conducting wires 54 and 55 are flexible coiled spring wire connections 60, 61, whereby connection and disconnection to the tube may be readily made.

The operation of the apparatus and the method of producing pinene ozonid is as follows:—The evaporating tank 15 is supplied with a proper amount of pinene or ozonizable substance through the screw cap opening 19, about one half full, so that the full surface area is covered with pinene thus assuring a constant maxium area for evaporation. The valves 18, 25 and 27 are then opened and electrical connection is made by connection plug 62 from a source of alternating current supply, as for example, from a commercial lighting socket. Air is drawn by the fan blower through the pipe opening 38 and discharged through the neck 10 of the fan into the hollow base 6 of the drying cylinder 1. The air then passes upward through the interstices between the lumps of the dehydrating agent, in the glass cylinder 2. The pan shaped casting 4 supports this dehydrating material and at the same time allows the air to pass through the holes 5 shown in Fig. 8. After the air is deprived of its moisture it passes into pipes 11 and 12. A portion of the air passes through pipe 11 into the dome of the ozone tube and then downward through the air gap 63 between the dielectric walls in Fig. 4. The high tension electrical discharge passing through the air gap 63 between the dielectric walls converts a portion of the oxygen contained in the air into ozone, and the ozonized air thus produced passes downward through the opening 50 in the base of the ozone tube and thence through pipe 24 shown in Figs. 1 and 12 into the gas combining or mixing chamber 28. Through the other outlet pipe 12 from the top of the drying chamber 1, air passes through valve 13 and pipe 14, shown in Fig. 2 and enters the pinene evaporating tank 15, as shown in Figs. 2 and 12. This stream of air from pipe 14 impinges upon the surface of the pinene in the first channel made by the vertical ribs 17, and passes in a continuous manner through all of the channels until it emerges from the evaporating tank 13 through the pipe 18 shown in Figs. 1 and 12 and enters the gas combining chamber 28. The stream of dry air thus passed over the surface of the pinene evaporates the latter and produces a saturated pinene vapor, and on intermingling in chamber 28 with the ozonized air entering through the pipe 24 combines chemically therewith by direct union and forms the optically visible gaseous pinene ozonid compound. The intermingled gases then pass through openings 29 in the vertical partition walls 30 and pass upward and downward alternately between the vertical partition walls 31 through the passages 32, by which means the gases are thoroughly diffused and intermingled and the pinene and ozone molecules brought into intimate contact so as to produce a complete chemical combination. The resulting gaseous pinene ozonid thus produced emerges through the pipe connection 27 shown in Figs. 1, 2 and 12 and passes upward into the vertical glass tube 34, and is thence carried upward to the outlet 64 at the top of the generator into the glass globe 35.

The area of the surface of the pinene in the pinene evaporating tank 15 is greater than necessary to fully saturate the air required for the operation, hence if the air supply to this tank is regulated by positioning valve 13 the exact amount of pinene vapor will be produced to combine completely and properly with the ozone in the ozonized air. The ozone produced by means of the ozone tube is practically a constant quantity as its area of electrical discharging surface and the voltage employed are constant factors. It is important that the air drying tube 1 be kept filled with an efficient dehydrating compound, as the presence of moisture in the air would tend to cause the production of nitrogen oxids in the ozone apparatus and the moisture would combine with the pinene ozonid product and cause its dissociation. The gaseous pinene ozonid produced by this intermingled and chemical union of pinene vapor and ozone appears in globe 35 as a whitish opaque vapor. It is, however, dry and entirely free from moisture and consists of extremely fine particles of the polymerized ozonid. These finely suspended particles if allowed to come to a state of rest in an inclosed space, as in globe 35, will slowly settle and leave a clear space above them. They have, however, a high vapor tension and tend rapidly to assume the gaseous state, and hence do not settle or deposit upon surfaces. The method of application for therapeutical use is to generate the gaseous pinene ozonid in copious quantities so that the patients subjected to its action may live normally in rooms or apartments and breathe a positively germicidal atmosphere in a natural manner.

My invention is not limited to use for therapeutical purposes, but is capable of use generally where it is desired to employ an efficient germicide; that is it may be used for disinfecting and fumigating purposes generally.

I do not claim herein the ozone-generating device illustrated in Figs. 1 and 4 to 7 inclusive, as the same forms broadly the subject-matter of a separate application filed by me under date of December 1, 1910, Serial No. 595,014.

What I claim and desire to secure by Letters Patent of the United States is:—

1. An apparatus for the generation of gaseous ozonids, comprising a source of ozone, means for producing a vapor of an ozonizable substance, and means separate from said last named means for commingling the ozone and said vapor.

2. An apparatus for the production of gaseous ozonids, comprising a source of ozone, means for producing a vapor of an ozonizable substance, a mixing chamber, and connections connecting said source and producing means with the mixing chamber.

3. An apparatus for producing gaseous ozonids, comprising an ozone generator, a vapor generator, a mixing chamber, and means for causing a continuous flow of ozone and vapor into the mixing chamber.

4. An apparatus for producing gaseous ozonids, comprising an ozone generator, a vapor generator, a mixing chamber, and means for causing a continuous flow of ozone and vapor into the mixing chamber, said means consisting of air impelling means supplying air to the ozone generator and the evaporating means.

5. An apparatus for generating gaseous ozonids, comprising an ozone generator, a vaporizer, a mixing chamber having independent connections with said generator and the vaporizer, and an air supply having independent connections with the generator and the vaporizer.

6. An apparatus for generating gaseous ozonids, comprising an ozone generator, a vaporizer for the substance to be ozonized, a mixing chamber having independent connections with the generator and the vaporizer, an air impeller connected to the generator and the vaporizer, and air drying means between said impeller, and said generator and vaporizer.

7. An apparatus for the production of gaseous ozonids, comprising an ozone generator, a receptacle for the substance to be ozonized, a mixing chamber independent of said generator and receptacle, means for passing a current of air through said receptacle to form a vapor of the substance therein, and to cause a flow of said vapor and ozone into the mixing chamber.

8. An apparatus for producing gaseous ozonids, comprising an ozone generator, a receptacle for the substance to be ozonized, connections connecting said generator and receptacle with said mixing chamber, means for supplying a current of air to the said generator and receptacle, and means for causing the air to take a circuitous path through said receptacle in contact with the substance therein.

9. An apparatus for the production of gaseous ozonids, comprising an ozone generator, means for feeding dry air thereto, a receptacle for the substance to be ozonized, a mixing chamber independent of said generator and receptacle, means for passing a current of air through said receptacle to form a vapor of the substance therein, and to cause a flow of said vapor and ozone into the mixing chamber.

In testimony whereof I have hereunto signed my name in the presence of two subscribing witnesses.

WILLIAM JOHN KNOX.

Witnesses:
M. E. McNINCH,
C. G. HEYLMAN.